United States Patent
Racineux et al.

(10) Patent No.: US 10,611,094 B2
(45) Date of Patent: Apr. 7, 2020

(54) ASSEMBLY METHOD BETWEEN A PART MADE OF METAL MATERIAL AND A PART MADE OF ORGANIC MATRIX COMPOSITE MATERIAL; CORRESPONDING PARTS MADE OF ORGANIC MATRIX COMPOSITE MATERIAL AND ASSEMBLY

(71) Applicants: ECOLE CENTRALE DE NANTES, Nantes (FR); FAURECIA AUTOMOTIVE COMPOSITES, Nanterre (FR)

(72) Inventors: Guillaume Racineux, Chateau Thebaud (FR); Didier Priem, La Chapelle sur Erdre (FR); Jean-Michel Lebrun, Nantes (FR); Yannick Amosse, Carquefou (FR); Chady Khalil, Mont Liban (LB)

(73) Assignees: ECOLE CENTRALE DE NANTES, Nantes (FR); FAURECIA AUTOMOTIVE COMPOSITES, Nanterre (FR)

( * ) Notice: Subject to any disclaimer, the term of this patent is extended or adjusted under 35 U.S.C. 154(b) by 177 days.

(21) Appl. No.: 15/537,556

(22) PCT Filed: Dec. 18, 2015

(86) PCT No.: PCT/FR2015/053654
§ 371 (c)(1),
(2) Date: Nov. 10, 2017

(87) PCT Pub. No.: WO2016/097656
PCT Pub. Date: Jun. 23, 2016

(65) Prior Publication Data
US 2018/0050496 A1    Feb. 22, 2018

(30) Foreign Application Priority Data

Dec. 19, 2014  (FR) ...................................... 14 62943

(51) Int. Cl.
*B29C 65/00* (2006.01)
*B29C 65/64* (2006.01)
(Continued)

(52) U.S. Cl.
CPC .............. *B29C 65/02* (2013.01); *B23K 20/06* (2013.01); *B23K 31/02* (2013.01);
(Continued)

(58) Field of Classification Search
CPC ..... B29C 65/00; B29C 65/002; B29C 65/004; B29C 65/02; B29C 65/44; B29C 65/565;
(Continued)

(56) References Cited

U.S. PATENT DOCUMENTS 6,226,152 B1 * 5/2001 Tanaka .................... B29C 65/00
  360/244.6
9,553,296 B1 * 1/2017 Dai .......................... H01M 2/22
(Continued)

FOREIGN PATENT DOCUMENTS

DE         1911940         9/1970
DE    102006024604 A1     11/2007
(Continued)

OTHER PUBLICATIONS

International Search Report, dated Apr. 6, 2016, which issued during the prosecution of International Patent Application No. PCT/FR2015/053654, which corresponds to the present application.
(Continued)

*Primary Examiner* — Philip C Tucker
*Assistant Examiner* — Brian R Slawski
(74) *Attorney, Agent, or Firm* — Troutman Sanders LLP (57) ABSTRACT

An assembly method between a part made of metal material and a part made of organic matrix composite material, said method having a step of providing two parts, each including a surface to be welded, and the surface to be welded of said
(Continued)

composite part is made up, at least partially, of an exposed portion of at least one metal insert which is partially embedded in said composite part; positioning said surfaces to be welded opposite and separated from each other; and projecting, at high speed, the surface to be welded of the metal part or the exposed portion of the metal insert, onto one another, to obtain high-speed clamping to one another and to obtain a weld between the exposed portion of the metal insert of the composite part and the complementary portion of the surface to be welded.

9 Claims, 4 Drawing Sheets (51) Int. Cl.
B29C 65/72 (2006.01)
B23K 20/06 (2006.01)
B32B 15/08 (2006.01)
B32B 37/00 (2006.01)
B29C 65/02 (2006.01)
B23K 31/02 (2006.01)
B23K 103/10 (2006.01)
B23K 103/14 (2006.01)
B23K 103/18 (2006.01)
B23K 103/00 (2006.01)
B23K 103/16 (2006.01)
B29L 31/30 (2006.01)
B29K 705/00 (2006.01)

(52) U.S. Cl.
CPC .......... B29C 66/1122 (2013.01); B29C 66/43 (2013.01); B29C 66/721 (2013.01); B29C 66/742 (2013.01); B23K 2103/10 (2018.08); B23K 2103/14 (2018.08); B23K 2103/172 (2018.08); B23K 2103/18 (2018.08); B23K 2103/42 (2018.08); B29C 65/002 (2013.01); B29C 65/004 (2013.01); B29C 66/003 (2013.01); B29C 66/30325 (2013.01); B29C 66/45 (2013.01); B29C 66/472 (2013.01); B29C 66/712 (2013.01); B29C 66/7392 (2013.01); B29C 66/826 (2013.01); B29K 2705/00 (2013.01); B29L 2031/3002 (2013.01); B32B 15/08 (2013.01)

(58) Field of Classification Search
CPC ....... B29C 65/72; B29C 66/00; B29C 66/003; B29C 66/303; B29C 66/3032; B29C 66/30325; B29C 66/348; B29C 66/43; B29C 66/47; B29C 66/472; B29C 66/4722; B29C 66/71; B29C 66/712; B29C 66/721; B29C 66/742; B29C 66/8244; B29C 66/826; B29C 65/56; B29C 65/60; B29C 65/606; B29C 65/64; B29C 66/1122; B29C 66/7392; B29K 2705/00; B23K 20/06; B23K 20/08; B23K 2103/16; B23K 2103/166; B23K 2103/172; B23K 2103/18; B32B 7/08; B32B 7/10; B32B 15/08; Y10T 29/49622
USPC ......... 156/60, 73.1, 73.5, 196, 272.2, 272.8, 156/290, 293, 297, 298, 299, 303.1, 156/308.2, 309.6, 324.4; 29/897, 897.2, 29/419.1, 419.2, 421.1, 421.2, 428; 280/781; 228/107, 110.1, 115, 120; 428/139, 301.1, 545, 624, 940
See application file for complete search history.

(56) References Cited

U.S. PATENT DOCUMENTS

2004/0028858 A1* 2/2004 Schnell .................. B29C 65/64
428/36.9
2004/0155030 A1 8/2004 Schmidt
2013/0140853 A1* 6/2013 Neumann .............. B62D 21/00
296/204

FOREIGN PATENT DOCUMENTS

DE 102011106700 A1 * 3/2012 ............. B23K 11/11
DE 102011106700 A1 3/2012
FR 2998210 A1 5/2014

OTHER PUBLICATIONS

Written Opinion, dated Apr. 6, 2016, which issued during the prosecution of International Patent Application No. PCT/FR2015/053654, which corresponds to the present application.

* cited by examiner

Fig.16

ASSEMBLY METHOD BETWEEN A PART MADE OF METAL MATERIAL AND A PART MADE OF ORGANIC MATRIX COMPOSITE MATERIAL; CORRESPONDING PARTS MADE OF ORGANIC MATRIX COMPOSITE MATERIAL AND ASSEMBLY

CROSS-REFERENCE TO RELATED APPLICATIONS

This application is the National Stage of International Application No. PCT/FR2015/053654, filed Dec. 18, 2015. The International Application claims priority to French Application No. 14 62943, filed Dec. 19, 2014. The International Application published on Jun. 23, 2016 as WO/2016/097656. All of the above applications are incorporated herein by reference.

TECHNICAL FIELD

The present invention relates to the assembly of two parts, i.e. a part made of a metal material and a part made of an organic-matrix composite material.

It relates in particular to a method for obtaining such an assembly, as well as an assembly consisted of two parts assembled together.

BACKGROUND

In many fields, in particular that of transport, the multi-material structures become widespread in order to respond to the increasing demands of the users (in particular in terms of lightening of the structures, aesthetics and implementation of new functionalities such as electrical insulation or damping).

It is hence frequent to need to associate parts made of a metal material with parts made of an organic-matrix composite material.

To ensure a satisfying stiffness of two parts assembled together, it is often preferable to make intimate links, generally obtained by welding.

Now, in practice, the metal materials and the organic-matrix composite materials are not compatible between each other for the implementation of a heterogeneous welding.

For this reason, the current technologies for the assembly of such materials are:
the mechanical assembly, for example screwing or riveting, and
the adhesion assembly, in particular by bonding.

But the mechanical assembly technology has in particular for drawback to generate an increase of the structure weight due to the link elements added. Moreover, a drilling of the parts for positioning these link elements may generate zones of weakness, of stress concentration or of fracture ignition.

As for the bonding assembly, it has for drawback to require a surface preparation, and also not to allow a reliable prediction of the long term behaviour of this bonding.

In this context, there exists a need for new technologies for assembling parts made of a metal material and parts made of an organic-matrix composite material.

SUMMARY

The present invention relates to a new technology for assembling a part made of a metal material (hereinafter called "metal part") and a part made of an organic-matrix composite material (hereinafter called "composite part"), which has for interest to be based on a welding assembly.

For that purpose, the present invention provides to add a metal insert in the composite part, at a surface to be welded, a portion of which is arranged in an exposed manner so as to be assembled by a high-speed welding technique to a complementary surface of the metal part.

The method according to the invention comprises the following successive steps:

a) a step of providing said two parts,
wherein said parts each have a surface intended to be welded to a complementary surface of the other part, and
wherein said surface to be welded of said composite part consists, at least partially, in an exposed portion of at least one metal insert that is partially embedded into said composite part, b) a step of positioning said surfaces to be welded opposite to each other and remote from each other, and c) a step of projecting (or thrusting or accelerating) at high speed the surface to be welded of the metal part and/or of the exposed portion of the metal insert, against one another, to obtain high-speed pressing of said surfaces to be welded against each other and to obtain a weld between the exposed portion of the metal insert of the composite part and the complementary portion of the surface to be welded of the metal part.

According to other advantageous characteristics, which can be taken in combination or independently from each other:

the composite part has a front face provided with the surface to be welded, and during the providing step, the metal insert of the composite part is located flush with the front face of said composite part, or back from the front face of said composite part (for example, in the case of a laminated composite material formed of several plies, located between said plies of said composite part, with a cut into the overlying plies to obtain the exposed portion of the metal insert);

for a composite part made of a thermoplastic material, the step of providing the composite part comprises an operation of including the metal insert into said composite part by heat and pressure;

the metal insert has a thickness comprises between 0.1 and 3 mm;

the metal insert and the metal part are made of a material chosen among steel, aluminium alloy and titanium;

the metal insert consists in a plate provided with through-holes or a solid plate; preferably, if the surface to be welded of the metal part is projected against the surface to be welded of the composite part, the metal insert consists in a plate provided with through-holes having a flared shape on the side of the exposed portion, to increase the mechanical pull-out resistance of the metal insert in the composite part;

if the surface to be welded of the metal part is projected against the surface to be welded of the composite part, at least a portion of the non-exposed surface of the metal insert, in contact with the composite material, is prepared, for example by shot blasting, so as to increase the surface of contact between said metal insert and the constitutive material of the composite part;

the metal part and/or the exposed portion of the metal insert has a portion to be projected, a front surface of which constitutes the surface to be welded, and the projecting step is obtained by means of a magnetic pulse that is applied to said portion to be projected; in this case, possibly, the metal part and/or the exposed portion of the metal insert is non-electrically conductive, and the portion to be projected has a rear surface, opposite the surface to be welded, which is covered with an electrically conductive material;

the projecting step is implemented so as to obtain a progressive pressing of the surfaces to be welded against each other, to ensure an expulsion of the oxides; in this case, preferably, said progressive pressing is obtained through (i) at least one electrically insulating shim provided between the two parts and surrounding the portion to be projected, or (ii) a boss-shaped portion to be projected, or (iii) a fold at the edge of the metal part, intended to form said portion to be projected;

the high-speed projecting step consists in a step of projecting at high speed the surface to be welded of the metal part against the surface to be welded of the composite part;

the high-speed projecting step consists in a step of projecting at high speed the exposed portion of the metal insert against the surface to be welded of the metal part.

The present invention also relates to a composite material part, having a surface to be welded that is formed, at least partially, by an exposed portion of at least one metal insert partially embedded into said organic-matrix composite material part.

According to a particular embodiment of this composite material part, the metal insert consists in a plate provided with through-holes having a flared shape on the side of the exposed portion; said metal insert is added into the composite part so that the composite material fills at least a part of said through-holes.

According to another particular embodiment, the composite part has a front face provided with the surface to be welded, and the metal insert of the composite part is located back from the front face of said composite part.

The invention also relates to an assembly comprising a part made of a metal material and a part made of a composite material, wherein said composite part includes at least one metal insert partially embedded into said composite part, wherein said at least one metal insert has an exposed portion at the surface of said composite part that is welded to a complementary portion of the surface of the metal part.

BRIEF DESCRIPTION OF THE DRAWINGS

The present invention will be further illustrated, without being limited thereby, by the following description of various embodiments illustrated in the appended figures, in which.

DETAILED DESCRIPTION

Figures 1, 2, 3:
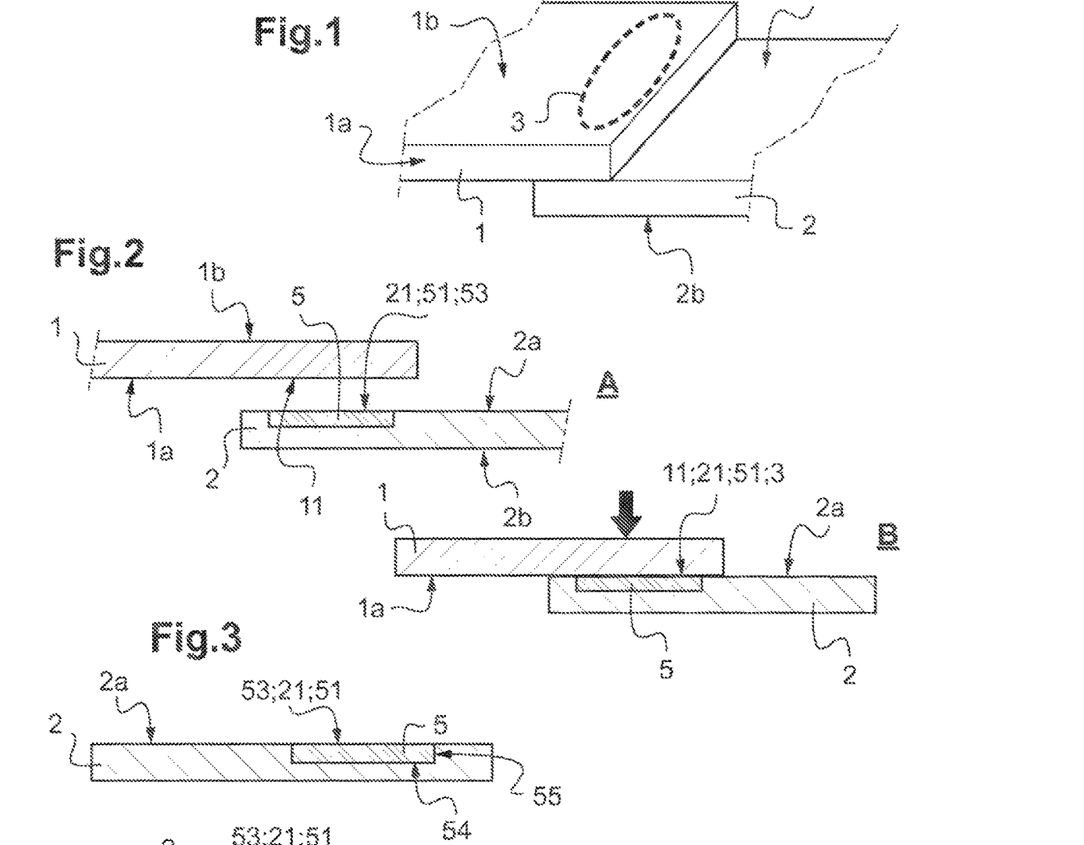
FIG. 1 is a schematic overall view of two parts assembled together by welding, after implementation of the method of assembly according to the invention.
FIG. 2 schematically shows, in cross-section, the two main steps of the method of assembly according to the invention, i.e. a positioning step (A) then a high-speed projecting step (B)
FIG. 3 shows a first possible embodiment of a composite part according to the invention, including a metal insert flush with a front face of said composite part.

As shown in FIG. 1, the present invention hence proposes a new technology for assembling, on the one hand, a part 1 made of a metal material and, on the other hand, a part 2 made of an organic-matrix composite material, at a welding zone 3.

For the sake of simplification, these parts 1, 2 are also referred to as "metal part 1" and "composite part 2", respectively.

By "assembly", it is understood in particular a link that is permanent, or non-dismountable (subjected to degradation or deterioration), between the two parts 1, 2 at the welding zone 3.

By "assembly", it is understood in particular a "weld" ensuring a continuity of the nature of the material to be assembled.

By "assembly", it is advantageously understood an assembly by high-speed pressing, preferably as a magnetic-pulse welding technique.

The metal part 1 is advantageously made of a metal material chosen among steel, aluminium alloy and titanium.

The metal part 1 is advantageously in the form of a plate.

As developed hereinafter, if this metal part 1 includes a portion to be projected 15, at least this portion to be projected 15 includes a thickness comprised between 0.5 and 3 mm.

All or part of the metal part 1, if it is fixed, may have any thickness.

This metal part 1 has in particular two opposite faces (FIGS. 1 and 2):
- a front face 1a, intended to come opposite the composite part 2 and including a surface to be welded 11 to form a portion of the welding zone 3, and
- a rear face 1b, opposite to said front face 1a.

For its part, the composite part 2 is consisted of a material comprising:
- reinforcing material, generally fibres, and
- an organic matrix.

The fibres of the reinforcing material are characterized by their composition (metal, glass, polymer, carbon, vegetable, . . . ), length (short (0.1 to 1 mm), long (1 to 50 mm) or continuous (longer than 50 mm), and arrangement (mat or woven) or multi-material NCF.

The continuous fibres may be arranged parallel to each other, for a unidirectional reinforcement, or according to a predefined angle (45° for example relative to each other), for a multidirectional reinforcement, or also randomly.

By "NCF" or "Non Crimp Fabrics", it is understood a multi-axial fabric that is consisted of several unidirectional (UD) webs (or layers), sawn together with a thread (generally PET).

For example, a +45°/−45° biaxial NCF material is a fabric consisted of two UD webs: the first web is consisted of a +45° UD and the second web is consisted of a −45° UD. There also exist 0°/90° biaxial NCF materials or 0°/+45°/−45° triaxial NCF materials.

This composite material may also be stratified, formed of several plies (not shown).

By "ply", it is commonly understood the composite semi-product (fibres plus matrix) in almost-bidimensional shape; it is also understood a thickness composed of parallel strands or "tapes", linked by matrix.

The organic matrix is advantageously chosen among the thermosetting materials or the thermoplastic materials.

By "thermosetting material", it is understood in particular:
- the unsaturated polyester resins (UP), which are generally used with glass fibres,
- the epoxide resins (EP), which are generally used with carbon fibres,
- the vinylester resins,
- the polyurethane resins,
- the phenolic resins (PF),
- the thermoset polyimide (PIRP) and polybismaleimide (BMI) resins.

By "thermoplastic material", it is understood in particular:
- the polypropylene,
- the polyamide,
- the polyetherimide (PEI),
- the polyphenylene sulfide (PPS) and
- the polyphenylene ether-ether-ketone (PEEK).

For its part, also, the composite part 2 is advantageously in the form of a plate, having a thickness comprised between 0.5 and 10 mm.

This composite part 2 includes in particular two opposite faces (FIGS. 1 and 2):
- a front face 2a, intended to come opposite the metal part 1 and including a surface to be welded 21 to form a portion of the welding zone 3, and
- a rear face 2b, opposite to said front face 2a.

According to the invention, the surface to be welded 11 of the metal part 1 is intended to be assembled, by a high-speed projecting technique, with the surface to be welded 21 of the composite part 2.

For that purpose, as illustrated in FIG. 2, the method according to the invention comprises following successive steps:
- a step of providing the two parts 1, 2 to be assembled,
- a step of positioning the surfaces to be welded 11, 21 opposite each other and remote from each other (part A of FIG. 2), and
- to obtain the welding zone 3 (part B of FIG. 2), a step of projecting at high speed the surface to be welded 11 of the metal part 1 against the surface to be welded 21 of the composite part 2 and/or the surface to be welded 21 of the composite part 2 against the surface to be welded 11 of the metal part 1.

To obtain such an assembly (whereas the respective materials are incompatible for a welded link), the composite part 2 provided includes at least one metal insert 5 that is partially embedded at its surface to be welded 21 (FIG. 2).

During the high-speed projecting step, the surface to be welded 11 of the metal part 1 is then pressed at high speed against the surface to be welded 21 of the composite part 2, hence causing a phenomenon of welding between the metal insert 5 of the composite part 2 and a complementary portion of the surface to be welded 11 of the metal part 1.

A welding link is hence obtained, with no material adding, between the metal insert 5 and the metal part 1 (corresponding to a continuity of the matter between each other).

The metal insert 5 is hence housed in the composite part 2, at the zone in which it is desired to make the assembly with the metal part 1.

For this reason, according to the case, the metal insert 5 may be placed remote from the edge of the composite panel 2, but also along this edge.

The metal insert 5, and the implantation thereof in the composite part 2, are described in more detail hereinafter in relation with FIGS. 2 to 9.

Herein, the metal insert 5 is implanted into the composite part 2 so as to show an exposed portion 51 that is naked at its surface to be welded 21 (FIG. 2—in particular part A).

By "exposed portion", it is hence understood a portion of the surface of the metal insert 5 that is directly accessible at the surface to be welded 21 of the composite part 2. In particular, this exposed portion 51 of the metal insert 5 must not be covered with the composite material, in particular with the organic matrix.

The metal insert 5 is made of a material that is chosen as a function of the material constituting the metal part 1 to be assembled.

In particular, this material is chosen so as to allow a technique of welding by dynamic pressing between the exposed portion 51 of the metal insert 5 and the surface to be welded 11 of the metal part 1.

For example, this metal insert 5 may be made of steel or an aluminium alloy when the metal part 1 is made of an aluminium alloy.

By way of non-limitative example, other possible combinations are:
Aluminium-aluminium,
Aluminium-copper
Aluminium-magnesium
Aluminium-titanium
Copper-copper
Copper-steel
Copper-bronze
Nickel-titanium
Nickel-nickel
Steel-steel Such a metal insert 5, for example in the form of a plate or a platen, includes:
an outer face 53, intended to form the exposed portion 51 of the metal insert 5,
an opposed, inner face 54, embedded within the material of the composite part 2, and
a peripheral contour 55, embedded within the material of the composite part 2.

For example, this metal insert has a thickness comprised between 0.1 and 3 mm.

Figures 4, 5, 6:
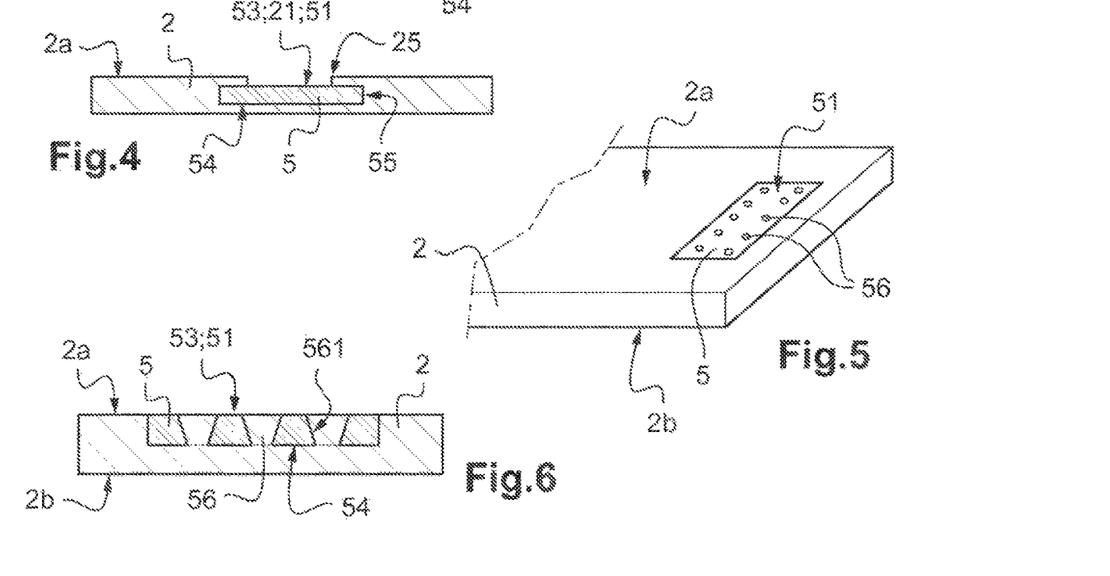
FIG. 4 shows a second possible embodiment of the composite part according to the invention, in which this part is of the multi-ply type and the metal insert is added between the plies thereof, the overlying plies being cut to obtain the exposed portion of said metal insert.
FIG. 5 shows, in top and perspective view, the surface to be welded of a composite part that is equipped with a metal insert consisting in a plate provided with a plurality of through-holes.
FIG. 6 schematically shows the composite part according to FIG. 5, viewed according to a vertical section plane, passing through its metal insert.

As shown in part A of FIG. 2, but also in FIGS. 3 and 4, the metal insert 5 is inlaid into the thickness of the composite part 2; it extends over only a part of its thickness.

In particular, as illustrated in FIG. 3, the metal insert 5 flushes with the front face 2*a* of the composite part 2.

In this case, the outer face 53 of the metal insert 5 and the front face 2*a* of the composite part 2 extend in a same plane, or at least approximately in a same plane.

As an alternative, as illustrated in FIG. 4, the metal insert 5 may be back from the front face 2*a* of the composite part 2; the outer face 53 of the metal insert 5 is hence back from the front face 2*a* of the composite part 2.

For that purpose, the metal insert 5 may be added between the plies (not shown) of the composite part 2.

A cut 25 is then made in the overlying plies with respect to the outer face 53 of the metal insert 5, so as to obtain the exposed portion 51 of the metal insert 5 corresponding to the surface to be welded 21 of the composite part 2.

To optimize the cohesion thereof with the composite material, the surface of the metal insert 5 in contact with this composite material, called the "non-exposed surface", may be prepared so as to obtain an irregular surface.

By "non-exposed surface", it is meant in particular the inner face 54 and/or the peripheral contour 55 of the metal insert 5.

For example, a shot blasting may be applied to this non-exposed surface of the metal insert 5, so as to increase the surface of contact between the matrix of the composite part 2 and the metal insert 5.

Moreover, the metal insert 5 may consist in a solid part or a perforated part.

For example, as illustrated in FIGS. 5 and 6, if the surface to be welded 11 of the metal part 1 is projected against the surface to be welded 21 of the composite part 2, the "fixed" metal insert 5 is provided with a plurality of through-holes 56, opening into its outer 53 and inner 54 faces.

Each of these through-holes 56 is delimited by a contour 561 that has a flared shape from the inner surface 54 to the outer surface 53 (FIG. 6), for example a generally truncated-cone or truncated-pyramid shape.

These through-holes 56 are advantageously filled with the constitutive material of the composite part 2 (organic matrix and possibly the fibres) so as to increase the mechanical pull-out resistance of the metal insert 5 added on the composite part 2.

The percentage of holes 56 is adapted as a function of the expected compromise between, on the one hand, the welded holding between the metal insert 5 and the metal part 1, and on the other hand, the holding of the metal insert 5 in the composite material.

A solid plate, fixed or to be projected, consists in a plate devoid of through-holes as described hereinabove in relation with FIGS. 5 and 6.

The metal insert(s) 5 of the surface to be welded 21 may have different shapes and sizes, as a function in particular of the desired assembly.

Figures 7, 8, 9:
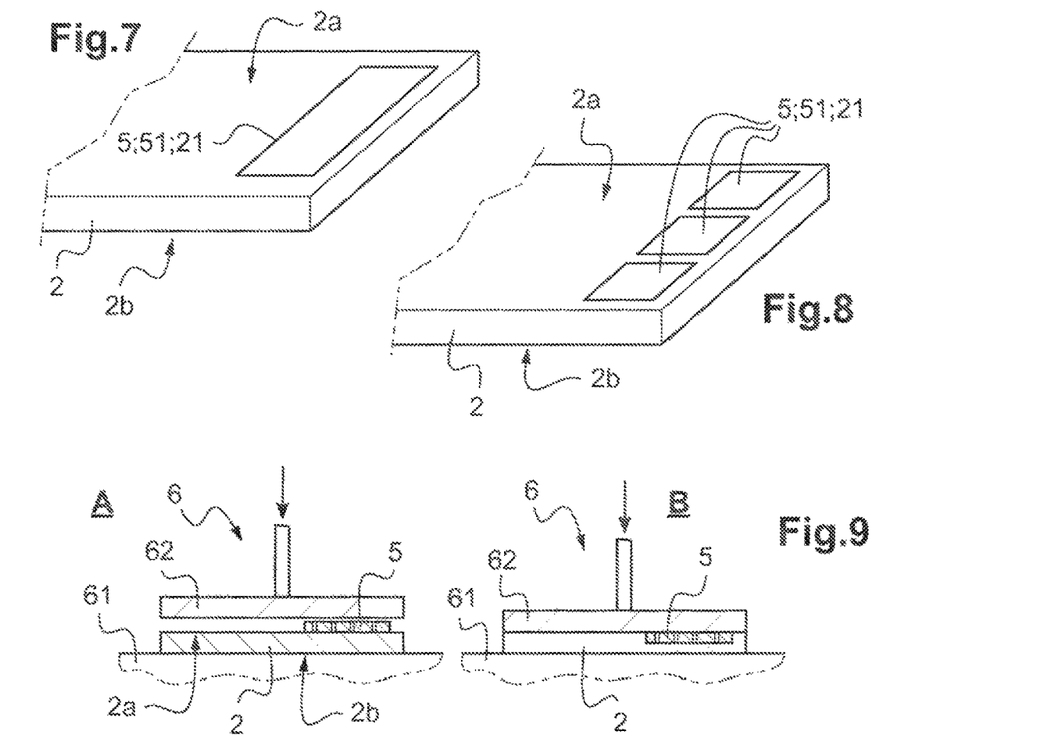
FIG. 7 shows, in schematic and perspective view, the surface to be welded of a composite part that is provided with a metal insert in the form of an elongated solid metal plate.
FIG. 8 shows, in schematic and perspective view, the surface to be welded of a composite part that is provided with several metal inserts juxtaposed to each other and each in the form of a solid metal plate.
FIG. 9 schematically illustrates, in two steps, an operation of including the metal insert, by heat and pressure, into the thickness of a composite part.

FIG. 7 shows a first embodiment in which the metal insert 5 of the surface to be welded 21 has an elongated shape, herein of generally rectangular shape.

The exposed portion 51 thereof hence also consists in an elongated strip of generally rectangular shape, to obtain a continuous welding zone 3.

For example, by way of indication, the metal insert 5 has a length comprised between 10 and 100 mm and a width comprised between 10 and 30 mm.

FIG. 8 also shows another embodiment in which the surface to be welded 21 of the composite part 2 is consisted by the exposed portion 51 of a group of juxtaposed metal inserts 5 (herein three in number), to form a zone of spot welding 3.

Each metal insert 5 has herein a generally square or rectangular shape; its exposed portion 51 hence also consists in a square or rectangular shape.

For example, by way of indication, each metal insert 5 has a length comprised between 20 and 40 mm and a width comprised between 20 and 40 mm.

The composite part 2, with its added metal insert 5, may be obtained by any suitable method.

For example, as illustrated in FIG. 9, the composite part 2 may be obtained during an operation of inclusion of the metal insert 5 by heat and pressure within a heating press 6.

Such a method is possible in the case of a composite part 2 made of a thermoplastic material.

Such an operation of inclusion consists in:
placing a composite part 2, devoid of metal insert 5, on a fixed part 61 of the heating press 6,
placing the metal insert 5 on the front face 2*a* of the composite part 2, at the surface to be welded 21 thereof (part A of FIG. 9),
applying a pressure with heating through a mobile heating jaw 62 of the heating press 6, so as to heat the metal insert 5 and to inlay it into the composite plate 2 (part B of FIG. 9).

In particular, the metal insert 5 is heated up to a temperature that is function of the melting temperature of the matrix of the composite part 2. More precisely, this metal insert 5 is brought to a temperature equal to or higher than this melting temperature.

For example, the metal insert 5 is heated to a temperature of 260° C., with the application of a pressure of 27 bars, for a matrix made of extruded polyamide 6.6.

This assembly could also be obtained by any other method of assembly, for example by seaming (the metal insert 5 is seamed with the pre-impregnated fabrics before consolidation).

Starting from such a composite part 2 with its metal insert 5, as described hereinabove, the step of relative positioning of the two parts 1, 2 is implemented so that the surfaces to be welded 11, 21 extend opposite each other and at a distance advantageously comprised between 0.5 and 1.5 mm.

The high-speed projecting step is for its part implemented so as to obtain a high-speed pressing of the surfaces to be welded 11, 21 against each other and to obtain a weld between the exposed portion 51 of the metal insert 5 of the composite part 2 and the complementary portion of the surface to be welded 11 of the metal part 1.

By "high speed", it is understood in particular a speed comprised between 150 m/s and 400 m/s.

This projecting step is advantageously implemented through a pulse that is applied to a portion to be projected 15 of the metal part 1 and/or to the exposed portion 51 of the metal insert 5 (hence forming the portion to be projected of this metal insert 5).

Herein, this portion to be projected 15 of the metal part 1 has two opposites surfaces:
- a front surface 151, corresponding to the surface to be welded 11 of the metal part 1 and located on the side of its front face 1a, and
- a rear surface 152, opposite to the above-mentioned surface to be welded 11 and located on the side of the rear face 1b of the metal part 1.

A projecting force is hence applied to this portion to be projected 15, in a direction extending from the its rear surface 152 to its front surface 151 and in a direction oriented towards the surface to be welded 21 of the composite part 2.

The projecting step is advantageously obtained through magnetic-pulse projecting means 7.

A welding cycle, conventional per se, may be summarized by the 6 following steps:
- a charger is power supplied by an electrical energy grid;
- the electric energy is then stored in condensers as an electrostatic energy, the stored energy being progressively increased via the charging voltage controlled by an energy control unit;
- when the defined threshold of the charging voltage is reached, a spark-gap (or discharger) discharges very rapidly the electrostatic energy of the condensers into an inductor 71 (during this discharge, whose duration is of the order of about one hundred of ρs, extremely high electrical currents of the order of a few hundreds of kA are generated);
- the circulation of this high current through the inductor 71 generates very abruptly a magnetic induction field in the coil; there is transformation of electrostatic energy into magnetic energy; the thus-created magnetic field may have a great amplitude (of the order of several tenths of tesla); it is highly variable over time, hence generates in the metal part 1 to be welded induced currents also called "Foucault currents";
- the interaction between the primary magnetic field created by the coil and the currents induced in the metal part 1 generates significant forces of magnetic origin, forces acting mechanically on the metal part 1 in which circulate the Foucault currents;
- these magnetic forces transform very abruptly the magnetic energy into a mechanical energy acting radially on the portion to be projected 15 of the metal part 1 and/or on the exposed portion 51 of the metal insert 5, for the propulsion thereof onto the other part (the composite part 2 and the metal part 1, respectively), held fixed.

This projecting phenomenon is hence the consequence of an extremely rapid transfer of energy, the power of this process being of the order of several thousands of megawatts, but over very short durations.

This process is practically adiabatic and there is not really heat transfer; the welding between the metal insert 5 and the metal part 1 is performed "in cold state".

Indeed, the materials advantageously reach no more than 30° C. There is hence no thermally-affected zone in the composite material, which does not lose its properties.

The magnetic-pulse welding process also constitutes a welding method of the "Solid State" type, which means that the material is not melted during the welding cycle.

In the case of a non-electrically conductive metal part, the rear face 152 of the portion to be projected 15 is then advantageously covered with an electrically conductive material forming a "thruster", for example made of an aluminium alloy, so as to obtain the desired projecting effect.

As an alternative, it may be contemplated to use any other technique adapted to produce a high-speed projecting, for example through a mechanical action or through a laser shock.

In the different cases, under the effect of the propulsion force:
- the portion to be projected 15 is deformed so that its surface to be welded 11 is high-speed pressed against the surface to be welded 21 of the composite part 2, or
- the exposed portion 51 of the metal insert 5 is deformed so that its surface to be welded 21 is high-speed pressed against the surface to be welded 11 of the metal part 1.

This high-speed pressing then generates a phenomenon of welding between the exposed portion 51 of the metal insert 5 of the composite part 2 and the complementary portion of the surface to be welded 11 of the metal part 1.

A multi-material assembly is hence obtained, comprising a part 1 made of a metal material and a part 2 made of an organic-matrix composite material, wherein said composite part 2 includes a metal insert 5 partially embedded into said composite part 2, which metal insert 5 includes an exposed portion 51 at the surface 2a of said composite part 2, which is welded to a complementary portion of the surface 11 of the metal part 1.

Several embodiments are contemplatable to obtain this positioning and this projecting, as described in more details hereinafter in relation with FIGS. 10 to 13, and 16.

In these different embodiments, the projecting step is advantageously implemented so as to obtain a progressive pressing of the surfaces to be welded 11, 21 against each other, to ensure an expulsion of the oxides.

By "progressive pressure", it is understood in particular a contact between the surfaces to be welded that begins by one spot, then extends along a line, before propagating until the whole surface is in contact (welding surface).

Figure 10:
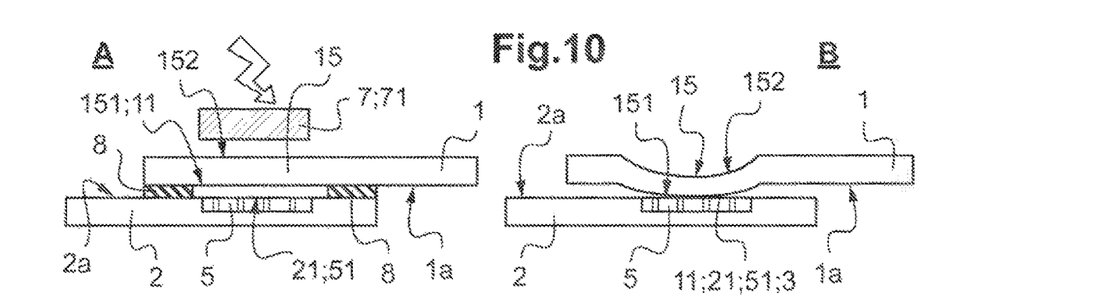
FIG. 10 schematically shows a first particular embodiment of the positioning and projecting steps of the method of assembly according to the invention, implementing a system of insulating shims.

According to a first embodiment illustrated in FIG. 10, the parts to be welded 1, 2 are arranged remote from each other through a system of electrically insulating shims 8 distributed over the perimeter of the surfaces to be welded 11, 21 (FIG. 10—part A).

The front faces 1a, 2a of the two parts 1, 2, and their respective surfaces to be welded 11, 21, are then separated by a distance equal to the height of the added shims 8.

The projecting step will then propel at high speed the portion to be projected 15 of the metal part 1, towards the surface to be welded 21 of the composite part 2, in the space separating their respective front faces 1a, 2a (FIG. 10—Part B).

The portion to be projected 15 hence finally has a convex arrangement with respect to the front face 1a of the metal part 1.

Figure 11:
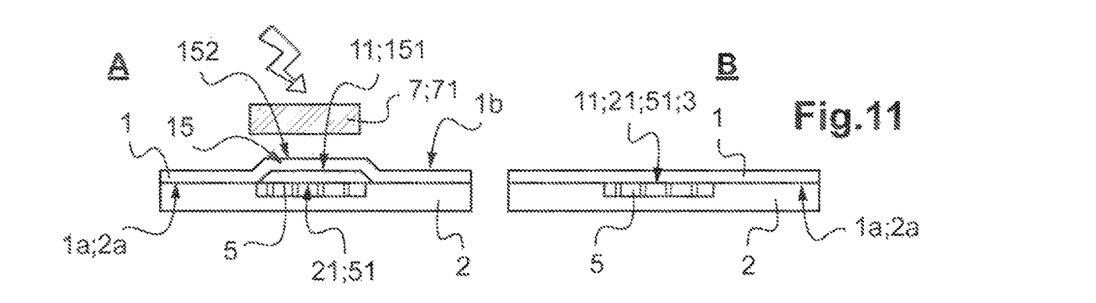
FIG. 11 schematically shows a second particular embodiment of the positioning and projecting steps of the method of assembly according to the invention, wherein the portion to be projected of the metal part is in the form of a boss.

According to another embodiment illustrated in FIG. 11, the portion to be projected 15 of the metal part 1 is initially in the form of a boss that is concave at the surface to be welded 11 (protruding at the rear face 1*b* of the metal part 1) (FIG. 11—part A).

The boss is in particular arranged so as to keep a distance comprised between 0.5 and 1.5 mm between its surface to be welded 11 and the surface to be welded 21 of the composite part 2.

The projecting step will hence propel at high speed the boss-shaped portion to be projected 15 of the metal part 1 towards the surface to be welded 21 of the composite part 2 (FIG. 11—part B).

The portion to be projected 15 hence finally has a planar or practically planar arrangement with respect to the metal part 1 (FIG. 11—part B).

Figure 12:
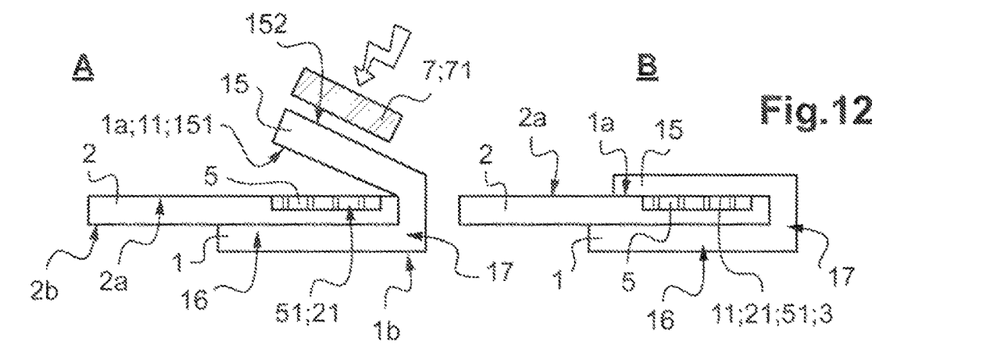
FIG. 12 schematically shows a third particular embodiment of the positioning and projecting steps of the method of assembly according to the invention, wherein the metal plate includes a portion to be projected having the form of a fold.

According to a third embodiment illustrated in part A of FIG. 12, the portion to be projected 15 of the metal part 1 consists in a folding of this metal plate 1, forming an angle with the surface to be welded 21 of the composite part 2.

The metal part 1 hence includes:
  a rear portion 16, covering the rear face 2*b* of the composite part 2,
  a lateral portion 17, conforming the edge of the composite part 2, and
  a front portion, extending opposite the front face 2*a* of the composite part 2 and forming a folding intended to constitute the portion to be projected 15.

The projecting step will hence propel at high speed the folding-shaped portion to be projected 15 of the metal part 1 towards the surface to be welded 21 of the composite part 2 (FIG. 12—part B).

The composite part 2 is hence finally taken in sandwich between the rear portion 16 and the front portion 17 of the metal part 1 (FIG. 12—part B).

Figure 13:
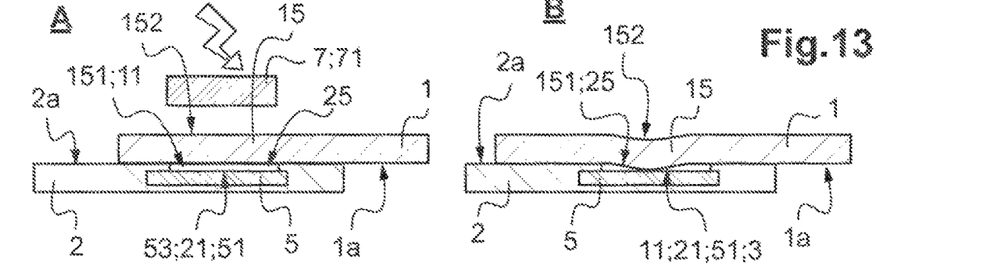
FIG. 13 schematically shows a fourth particular embodiment of the positioning and projecting steps of the method of assembly according to the invention, in the case of a composite part according to FIG. 4, whose metal insert is added between the plies thereof.

According to a fourth embodiment illustrated in FIG. 13, the composite part 2 of FIG. 4 (with the metal insert 5 added between the plies of said composite part 2) and a planar metal part 1 are arranged onto each other (FIG. 13—part A).

The front faces 1*a*, 2*a* of the two parts 1, 2 bear against each other, and their respective surfaces to be welded 11, 21 are then separated by a distance equal to the height of the overlying plies with respect to the outer face 53 of the metal insert 5.

This height also corresponds to the height of the cut 25 formed in the above-mentioned overlying plies.

The projecting step will hence propel at high speed the portion to be projected 15 of the metal part 1, towards the surface to be welded 21 of the composite part 2, in the space separating their respective surfaces to be welded 11, 21 (FIG. 13—part B).

The portion to be projected 15 hence finally has a convex arrangement with respect to the front face 1*a* of the metal part 1, extending within the cut 25.

In this case, the distance between the surfaces to be welded 11, 21 allows a direct welding, without using insulators or studs.

Figure 14:
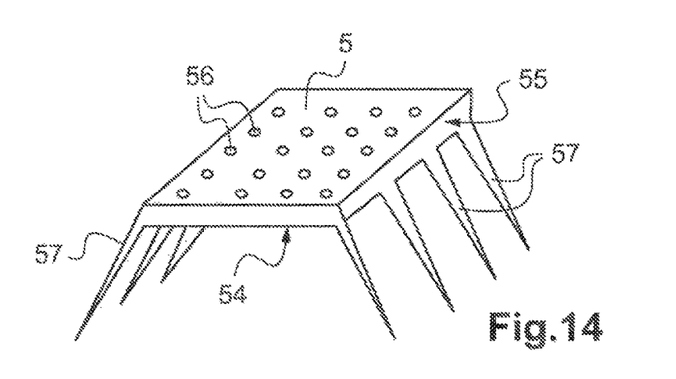
FIG. 14 schematically shows another embodiment of the metal insert according to the invention, of the "fastenable" insert type.

FIG. 14 schematically shows another embodiment of the metal insert 5 according to the invention, of the "fastenable" insert type, to optimize the cohesion thereof with the composite material.

Such a metal insert 5, similar to that described hereinabove in relation with FIGS. 2 to 9, also include integral mounting tabs 57 that are distributed at the peripheral contour 55 thereof (in particular, the great sides thereof) and that extend on the side of its inner face 54.

The metal insert 5 advantageously includes through-holes 56 as developed hereinabove in relation with FIGS. 5 and 6.

The opposite integral mounting tabs 57 (connected to the two great sides) are herein divergent relative to each other, moving apart from each other from the metal insert 5.

These mounting tabs 57 are also flexible, so as to be folded over at the time of the mounting of the metal insert 5 onto the composite part 2.

Figure 15:
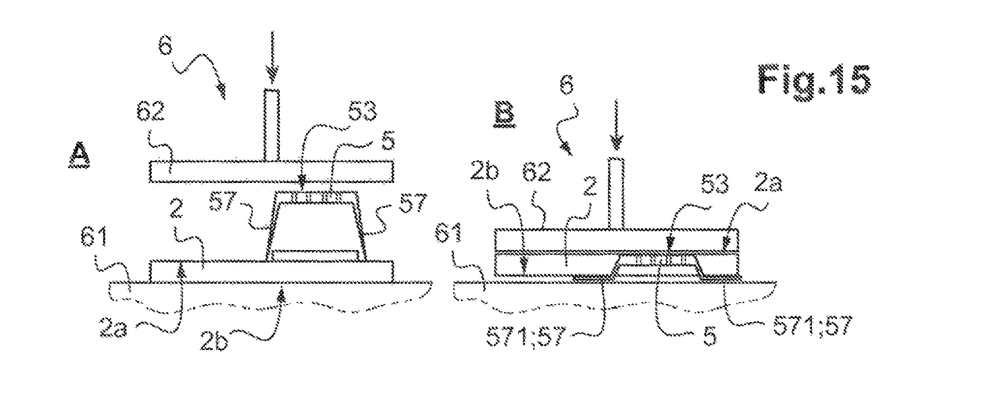
FIG. 15 schematically illustrates, in two steps, an operation of including the metal insert according to FIG. 14, by heat and pressure, into the thickness of a composite part.

In this respect, FIG. 15 schematically shows an operation of inclusion of the metal insert 5 according to FIG. 14, by heat and pressure, into the thickness of a composite part 2, according to a method similar to that described hereinabove in relation with FIG. 9.

Such a method is possible in the case of a composite part 2 made of a thermoplastic material.

Such an operation of inclusion consists in:
  placing a composite part 2, devoid of metal insert 5, on a fixed portion 61 of the heating press 6,
  placing the metal insert 5 on the front face 2*a* of the composite part 2, at the surface to be welded 21 thereof (part A of FIG. 15),
  applying a pressure with heating through a mobile heating jaw 62 of the heating press 6, so as to heat the metal insert 5 and to inlay it into the composite plate 2.

Here again, the metal insert 5 is heated up to a temperature that is function of the melting temperature of the matrix.

During this last step, the integral mounting tabs 57 get into the thickness of the composite part 2 to go out on the side of its rear face 2*b*, until the outer face 53 of the metal insert 5 extends in the plane, or at least approximately in the plane, of the front face 2*a* of the composite part 2.

The protruding portion 571 of these integral mounting tabs 57 (going out on the side of the rear face 2*b* of the composite part 2) are then folded over against the rear face 2*b* of the composite part 2, advantageously by means of an adapted shape of the fixed portion 61 of the heating press 6.

Figure 16:
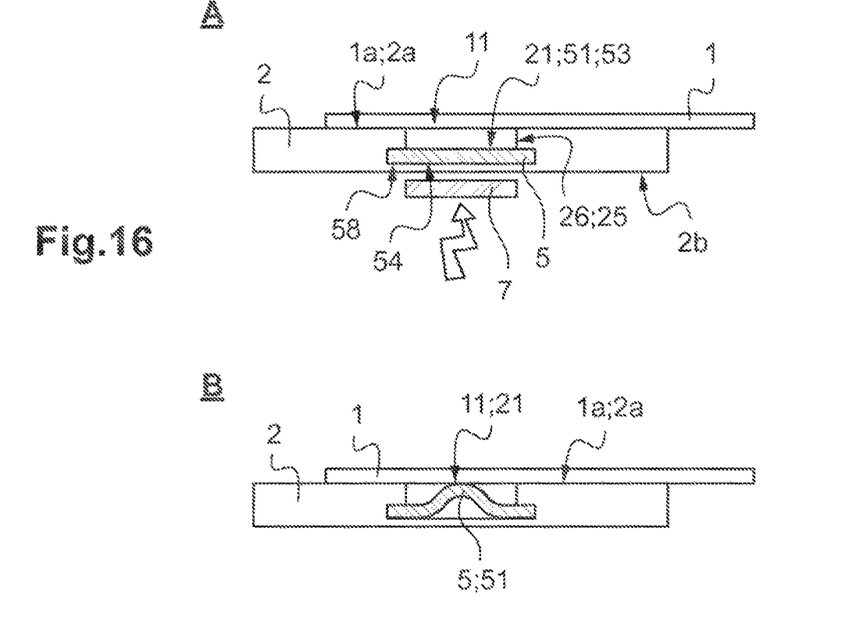
FIG. 16 schematically shows a fifth particular embodiment of the positioning and projecting steps of the method of assembly according to the invention, in the case of a composite part according to FIG. 4, whose metal insert is projected against the metal part.

FIG. 16 illustrates an alternative embodiment of the fourth embodiment according to FIG. 13.

Here again, the composite part 2 of FIG. 4 (with the metal insert 5 added between the plies of said composite part 2) and a planar metal part 1 are arranged onto each other (FIG. 16—part A).

The metal insert 5 of the composite part 2 (and in particular its outer face 53) is located back from the front face 2*a* of said composite part 2, within a blind hole 26 open at said front face 2*a* and closed at the rear face 2*b*.

The metal insert 5 is implanted into the composite part 2 so as to have—the exposed portion 51 that is naked at its surface to be welded 21, and—a peripheral portion 58 embedded into the composite material.

The front faces 1*a*, 2*a* of the two parts 1, 2 bear against each other; and their respective surfaces to be welded 11, 21 are also separated by a distance equal to the height separating the outer face 53 of the metal insert 5 and the front face 2*a* of said composite part 2.

This recess advantageously corresponds to the overlying plies with respect to the outer face 53 of the metal insert 5. This height then corresponds to the height of the cut 25 formed in the above-mentioned overlying plies.

The projecting step will hence consist in propelling at high speed the surface to be welded 21 of the composite part 2 (herein the exposed portion 51 of the metal insert 5) towards the surface to be welded 11 of the metal part 1, in the space separating their respective surfaces to be welded 11, 21 (FIG. 16—part B).

The projecting force is applied to this exposed portion 51, in a direction extending from its inner face 54 to its outer surface 53 and in a direction oriented towards the surface to be welded 11 of the metal part 1.

The projecting step is advantageously obtained through magnetic-pulse projecting means 7, arranged opposite the rear face 2b of the composite part 2 and the inner face 54 of the metal insert 5.

The exposed portion 51 of the metal insert 5 hence finally has a convex arrangement, towards the front face 1a of the metal part 1 and the front face 2a of said composite part 2, extending within the cut 25.

In this case also, the distance between the surfaces to be welded 11, 21 allows a direct welding, without using insulators or studs.

Generally, the present invention has for interest to allow an efficient assembly between a metal part and a composite part, without affecting their respective properties.

This technical solution has moreover the interest to allow the implementation of conventional means, commonly used for assembling two metal parts together.

The invention claimed is:

1. An assembly comprising a part made of a metal material and a part made of an organic-matrix composite material, coming from a method of assembly comprising the following successive steps:
   a) a step of providing said two parts,
   wherein said parts each include a surface intended to be welded to a complementary surface of the other part, and
   wherein said surface to be welded of said composite part consists, at least partially, in an exposed portion of at least one metal insert that is partially embedded into said composite part,
   b) a step of positioning said surfaces to be welded opposite to each other and remote from each other, and
   c) a step of projecting at high speed the surface to be welded of the metal part and/or of the exposed portion of the at least one metal insert, against one another, to obtain high-speed pressing of said surfaces to be welded against each other and to obtain a weld between the exposed portion of the at least one metal insert of the composite part and the complementary surface to be welded of the metal part, the metal part and/or the exposed portion of the at least one metal insert including a portion to be projected, a front surface of which constitutes one of the surfaces to be welded, and the projecting step is implemented so as to obtain a progressive pressing of the surfaces to be welded against each other, to ensure an expulsion of oxides, said progressive pressing being obtained through:
   at least one electrically insulating shim provided between the two parts and surrounding the portion to be projected, or
   a boss-shaped portion of the metal part to be projected,
   the part made of a metal material comprising a front face opposite the composite part, the composite part comprising a front face opposite the metal part and a rear face, opposite to said front face, and said at least one metal insert including an outer face forming the exposed portion of the at least one metal insert,
   wherein the portion to be projected has a convex arrangement with respect to the front face of the metal part, or
   a cut is made in overlying plies of the composite part with respect to the outer face of the at least one metal insert, the portion to be projected having a convex arrangement with respect to the front face of the metal part the convex arrangement extending within the cut, or
   a cut is made in overlying plies of the composite part with respect to the outer face of the at least one metal insert, the exposed portion of the at least one metal insert having a convex arrangement towards the front face of the metal part and the front face of said composite part, extending within the cut.

2. The assembly according to claim 1, wherein the at least one metal insert of the composite part is located:
   flush with the front face of said composite part, or
   back from the front face of said composite part.

3. The assembly according to claim 1, wherein the composite part is made of a thermoplastic material, wherein the at least one metal insert is included by heat and pressure, into said composite part.

4. The assembly according to claim 1, wherein the at least one metal insert is made of steel, aluminium alloy or titanium, and wherein said metal part is made of steel or aluminium alloy.

5. The assembly according to claim 1, wherein the at least one metal insert consists of a plate provided with through-holes or a solid plate.

6. The assembly according to claim 5, wherein the at least one metal insert consists of a plate provided with through-holes having a flared shape on the exposed portion added in the composite part so that the composite material fills at least a part of said through-holes.

7. The assembly according to claim 1, wherein at least a portion of a non-exposed surface of the at least one metal insert, in contact with the composite material, is prepared so as to increase a surface of contact between said at least one metal insert and the composite material of the composite part.

8. The assembly according to claim 1, wherein the metal part and/or the exposed portion of the at least one metal insert is non-electrically conductive, and in that the portion to be projected includes a rear surface, opposed to the surface to be welded of the metal part or the at least one metal insert, that is covered with an electrically conductive material.

9. The assembly according to claim 1, wherein the progressive pressing is obtained through a fold at an edge of the metal part, intended to form said portion to be projected, and the part made of a metal material comprises a rear portion, covering the rear face of the composite part, a lateral portion conforming to an edge of the composite part, and a front portion extending opposite the front face of the composite part and forming a folding intended to constitute the portion to be projected, the composite part being sandwiched between the rear portion and the front portion of the metal part.

* * * * *